United States Patent [19]

Michael et al.

[11] 4,272,787
[45] Jun. 9, 1981

[54] T.V. PICTURE FREEZE SYSTEM

[75] Inventors: Peter C. Michael, Newbury; Richard J. Taylor, London; Paul R. N. Kellar, Newbury, all of England

[73] Assignee: Micro Consultants Limited, Berkshire, England

[21] Appl. No.: 67,496

[22] Filed: Aug. 16, 1979

[30] Foreign Application Priority Data

Sep. 7, 1978 [GB] United Kingdom .............. 35988/78

[51] Int. Cl.³ .............................................. H04N 5/22
[52] U.S. Cl. .................................... 358/160; 358/105; 360/10
[58] Field of Search ............... 358/105, 136, 160, 127; 360/10, 11, 35

[56] References Cited

U.S. PATENT DOCUMENTS

| | | | |
|---|---|---|---|
| 4,009,330 | 2/1977 | Cutler et al. | 358/105 |
| 4,058,840 | 11/1977 | Kasprzak | 360/10 |
| 4,148,070 | 4/1979 | Taylor | 358/903 |
| 4,163,249 | 7/1979 | Michael et al. | 358/21 R |
| 4,172,264 | 10/1979 | Taylor et al. | 358/22 |

Primary Examiner—Joseph A. Orsino, Jr.
Attorney, Agent, or Firm—Dowell & Dowell

[57] ABSTRACT

A T.V. picture freeze system capable of capturing a video frame comprising first and second fields. Movement is detected between fields for each picture point and data indicative of any movement is stored and is used on read out to determine whether the picture information is taken from a single field, when movement has occurred or from both fields when movement has not occurred for that portion of the picture.

9 Claims, 5 Drawing Figures

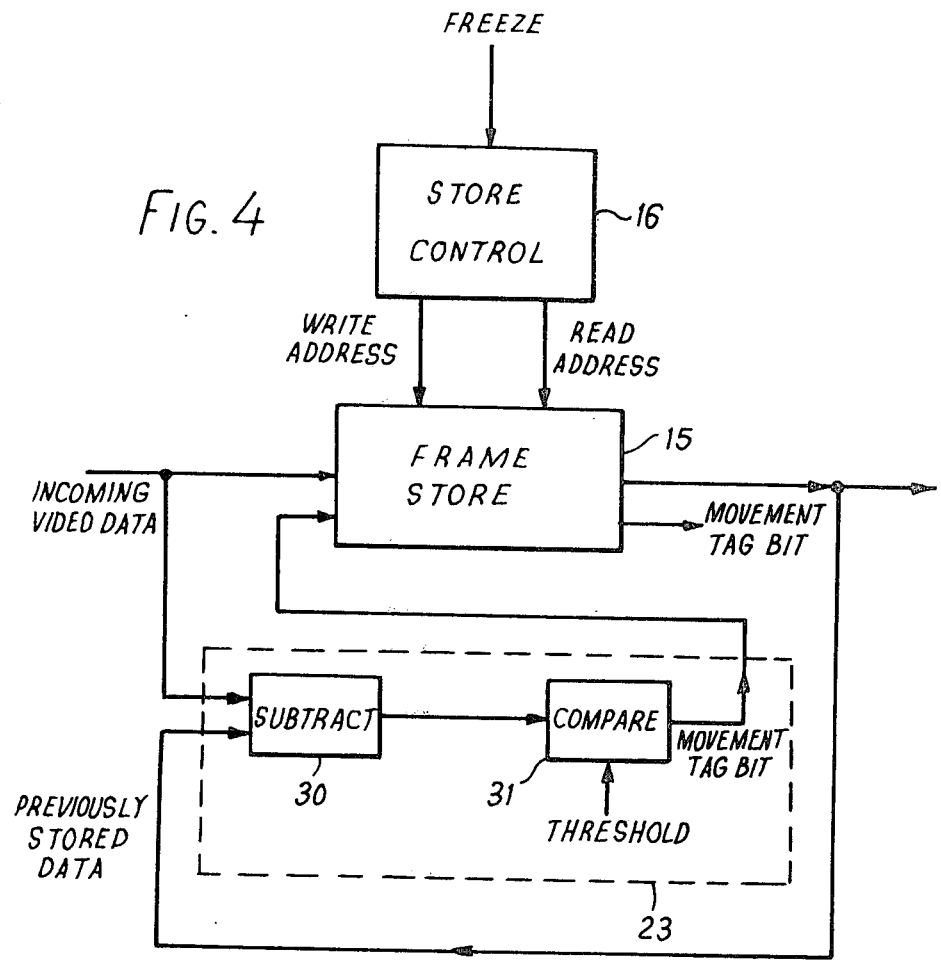

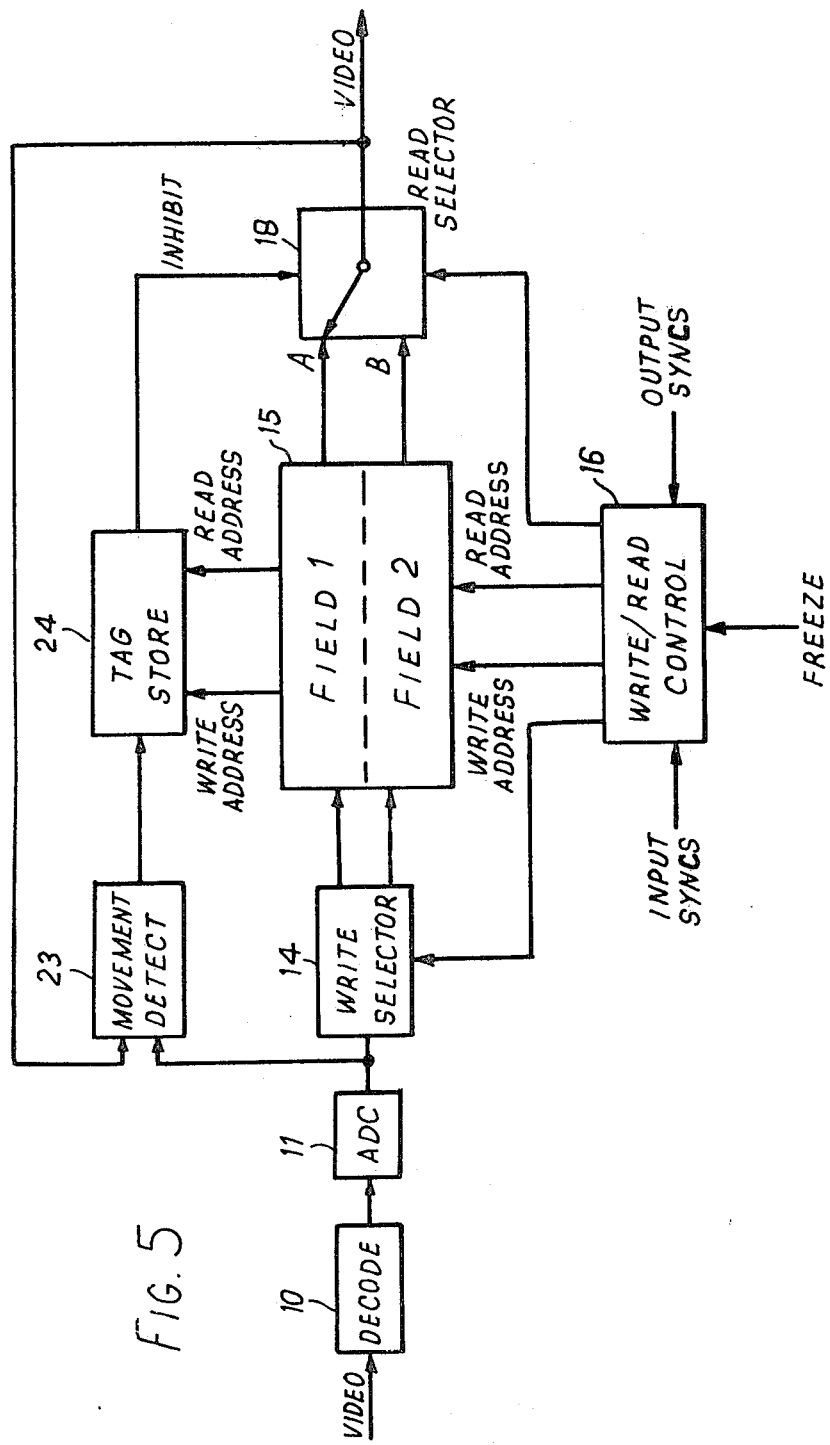

T.V. PICTURE FREEZE SYSTEM

BACKGROUND TO THE INVENTION

From time to time it is necessary to produce a still television picture for transmission purposes from a scene which originally contained moving portions. An apparatus which is capable of freezing a moving television picture consists of a field or frame store into which television information is successively entered and from which the same information is successively retrieved for onward transmission. Such a frame store is disclosed in the processing system of U.S. Pat. No. 4,148,070 and which store is the subject of U.S. patent application Ser. No. 764,148 (and British Patent Application No. 6585/76). A freeze is initiated by inhibiting the writing process so that the data contained within the store at any one moment is cyclically read and transmitted onwards.

If the store comprises a single field store, then the field is repeated to produce a two-field system of interlace according to the requirements of a standard television system, such as PAL or NTSC.

If the store comprises a framestore, it is necessary to modify the operation during a freeze as, during the writing process that preceded the freeze operation, some difference between the two fields in store due to movement may have taken place. It is normal to prevent this movement flicker by inhibiting the operation of one or other of the fields in store and making use of a repeated single field sequence rather than selecting the two field read out which could be used if the picture is completely stationary (see also FIG. 1).

A main disadvantage of such a system is the reduction in vertical resolution caused by using a single field system which effectively halves the vertical bandwidth. It is an intention of the present invention to eliminate or reduce this disadvantage in order to produce a frozen picture, which contains the full vertical detail where possible.

SUMMARY OF THE INVENTION

According to the invention there is provided a picture freeze system comprising: frame storage means for storing information from first and second fields of a television picture; movement detector means for detecting any picture movement; storage means for storing data indicative of any movement detected; and selector means for selectively outputting information from a single or both fields in dependence on the stored movement data.

According to a further aspect of the invention there is provided a method of freezing a T.V. picture which may have at least some parts which have moved relative to a previous frame, said method comprising: storing information from first and second fields of the television picture; detecting any picture movement present on the information and storing data thereon, and selectively outputting information from a single or both fields of the picture in dependence on the stored movement data.

The invention is thus concerned with providing the facility of being able to selectively determine, picture point by picture point, whether movement has occurred and if movement has occurred then to selectively control the read out so that information from both fields is used when no movement has been detected and only a single field is used for any parts of the picture where movement has occurred.

BRIEF DESCRIPTION OF THE DRAWINGS

The invention will now be described by way of example with reference to the accompanying drawings, in which:

FIG. 4 shows one arrangement suitable for the movement detector system, and FIG. 5 shows an arrangement in more detail for controlling the read selector.

DESCRIPTION OF PREFERRED EMBODIMENTS

Figure 1:
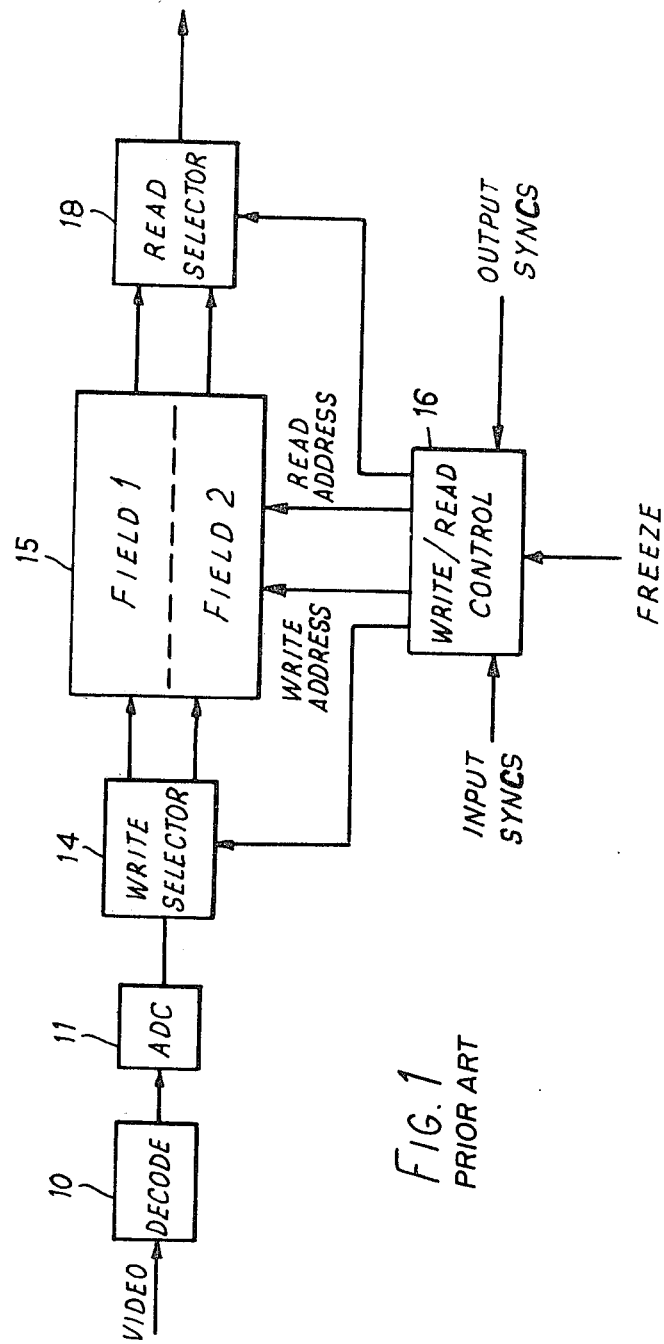
FIG. 1 shows a known picture freeze arrangement.

To provide a comparison between a known freeze system and the present invention, a knwon arrangement is shown in FIG. 1. Incoming video signals having been decoded into luminance and chrominance components (Y,I and Q) in decoder 10 are converted into digital form in analog to digital converter 11 and pass to the frame store 15 via write selector 14 which selector and store are controlled by store control 16. The store control 16 provides picture store write addressing for the incoming picture point information by means of internal picture point counters and also determines field selection using the standard incoming sync pulses as a reference. In a similar manner addressing and field selection at the read side of the system uses the output syncs as a reference for store control 16, which controls the read addressing for the store and the read selector 18. When the system is operated in the freeze mode the writing process is inhibited and the read process modified by inhibiting the switching from field to field so that a single field sequence is repeated for the entire picture. This single field sequencing effectively reduces the vertical resolution and the present invention provides a solution to this problem.

Figure 2:
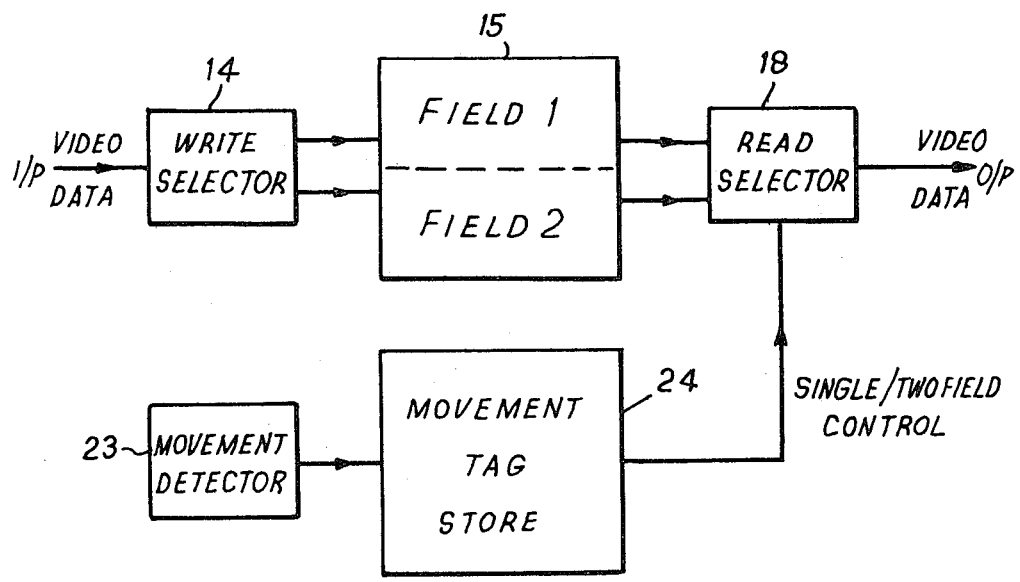
FIG. 2 shows an embodiment of the freeze picture system of the invention.

The embodiment of the freeze system of the invention shown in FIG. 2 comprises a write selector 14 which can be switched to input the incoming video information to the first or second field storage area of the frame store 15 in dependence on which field the incoming information is from using known techniques. It is assumed that the information is already in digital form but if the incoming signal were in analog form such a signal could be first converted via an analog to digital converter into the required form using standard techniques.

The read selector 18 can operate in a similar way to the write selector; however in the present system it is under the control of the movement detector 23 and tag store 24 so as to be capable of being switched as many times as required during a frame to select the required field in dependence on any movement detected picture point by picture point. The store control, although omitted in this Figure, would in practice be present but is not shown for the sake of clarity.

Figure 3:
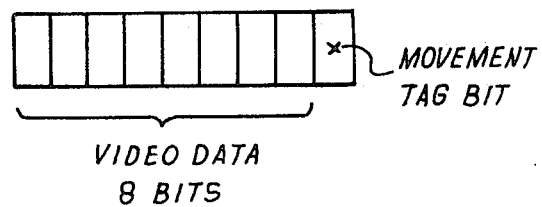
FIG. 3 shows one method of storing movement information with the associated video data.

An example of the format of the video and tag data is shown in FIG. 3. The video data is shown as an 8 bit word in which an additional single bit is available to provide the movement tag. Although the movement tag is shown as being stored in a separate store 24 in FIG. 2 this tag store can be integral with the frame store 15 if this were suitably expanded.

Movement detector techniques are already known. In the processing system described in British Patent Application No. 42751/76 (U.S. Application Ser. No. 841,519), movement detectors have been described for use in adaptive noise reduction systems and adaptive interpolation systems. In the aforementioned applications a movement detector, together with a system of expansion, contraction and noise reduction of the television picture are provided integrated within one equipment system. The present system, the subject of our present application, may make further use of the movement detector systems already described, so that frozen pictures may be improved. There are a number of ways of detecting movement in a television picture, the simplest of which relies upon the comparison of data on the current field with that in an equivalent field taken earlier in time. In other words, the input and output of a frame store is compared in order to detect a difference. An efficient movement detector needs to be capable of differentiating between noise and movement both of which have similar characteristics in many respects. It is not the intention of this invention to describe a movement detector in detail but to make use of an effective available movement detector in order to undertake the freeze processing to be described. However, to provide a clear understanding of how a movement detector operates to allow sufficient understanding of the present application a basic detector scheme is shown in FIG. 4. This and more complex detector systems can be found in the above mentioned applications.

In this detector system a subtractor 30 within detector 23 subtracts incoming data with old data made available from an output of frame store 15 under the control of the standard picture point counters associated with the store control 16 in the normal way so that the incoming picture point received by the subtractor corresponds to the same picture point from a previous field. The output from the subtractor 30 is received by a comparator 31 which compares this output with a preset threshold level. If this level is exceeded then the picture is deemed to have moved at this location and the comparator output effectively provides the movement tag for storage as a logically high or low level to provide the one bit tag. More complex movement detectors would determine this one bit condition in more elaborate ways to distinguish true movement from picture noise (as described in the above mentioned applications).

The movement tag, as already explained, can be stored in a separate movement tag store 24, but alternatively (as shown in FIG. 4) use can be made of the existing frame store if this is expanded to allow the additional bit to be catered for, which tag bit will also be frozen during the freeze mode.

Returning to FIG. 2, if we take, for example, a frame store system which is examining a completely still scene, then it is entirely feasible to use the whole contents of the frame store in a repetitive manner to recreate the frozen scene without any movement flicker and without any loss of vertical resolution.

It is only during periods when movement takes place between the two fields that it becomes necessary to utilise a single field for frozen picture reproduction. In our system, a combination of single field and two field reproduction is utilised in order to optimise the resultant reproduced frozen picture.

The principle of the invention is thus concerned with utilizing the parts of the two frames which remain still and parts of a single frame which is moving in order to reconstruct a frozen picture with full detail. The read selector 18 under the control of the previously detected movement data, switches between single field and two field reproduction dependent upon the decision previously made by the movement detector.

It will be appreciated that once the mechanism has entered the freeze state, no further method of detecting motion is available, which relies upon the continuing comparison of new incoming data with previously stored data. This is why it is necessary, as described above, to store the decisions made by the movement detector in such a way as to make them available for subsequent use during a frozen picture operation. The video store has at least one additional bit of storage at each picture point location (within the frame store or as separate storage). The contents of this single bit store is then utilized in the decisions which need to be made when entering a freeze mode. The contents of this single bit store will in effect map the areas of the picture which are known to have moved between the two fields currently in store. During periods when no movement has been detected, read out sequence occurs from both fields in store. During periods when movement is known to have occurred, information is retrieved from only a single field store and repeated in order to produce the correct television standard field sequence. The tag data (also frozen) determines this selection.

As already explained, the present system preferably utilises a decoded television system in which chrominance is separated from luminance and stored separately. The techniques described for example in British Patent Application No. 42751/76 (and U.S. Ser. No. 841,519) makes use of the storage of Y on one channel, whilst I and Q are stored on the other channel alternately. Whilst it may not be necessary to decode the television signal in order to achieve the improved picture freeze mechanism described, the implementation of a nondecoded system becomes more complex.

The improved freeze mechanism, the subject of the present invention, may be utilized in conjunction with the image expansion and contraction system of the above mentioned patent application. In that system, picture points may be artificially created from existing picture points, such that the size of the television image may be artificially expanded or contracted electronically. The freeze mechanism described above will operate entirely satsifactorily with such pictures which are other than normal full size. That is to say, it is possible to first of all expand a television scene electronically and then freeze that scene in such a way that full vertical detail is maintained.

An example of the control of the read selector 18 in dependence on the generated tag indicative of movement is shown in FIG. 5. The movement detector output bit (high or low in dependence on any movement detected) is written into tag store 24 which may conveniently be a single bit version of frame store 15 and use the same store control 16. When the data from the frame store is being read out, the tag data will also be read out as dictated by control 16 and this data bit will simply determine whether the selector is allowed to be moved to position A or B. In normal circumstances when no picture freeze is required then sequencer would be in position A during field 1 and position B for field 2. In the previously known freeze arrangement the selector would have been held in (say) position A for both fields. In the present configuration the selector is held in (say)

position A for both fields when moving points of the picture are being read out (as indicated by the state of the movement tag) and will be switched into position A for field 1 and position B for field 2 when no movement is present (as indicated by the state of the movement tag) when picture freeze is selected. Read selector 18 can be realised using standard solid state switching, the tag providing the logic level to supply the required inhibit control. During picture freeze selection the movement tag is also effectively frozen via the control 16. The output from selector 18 can be converted back into analog form and chrominance and luminance encoded as desired.

We claim:

1. A picture freeze system comprising:
   frame storage means for storing picture information from first and second fields of a television picture;
   movement detector means for detecting on a picture point by picture point basis any picture movement from the information on a predetermined portion of the picture;
   movement data storage means for storing data indicative of any movement detected picture point by picture point; and
   selector means for selectively outputting stored picture information picture point by picture point from a single or both fields in dependence on the stored movement data to provide information from both fields during parts of the picture where no movement has been detected and from only a single field from parts of the picture where movement has occurred.

2. A system according to claim 1, wherein the frame storage means and the movement data storage means comprise a combined solid state store to allow the movement data to accompany the picture information.

3. A system according to claim 1, wherein the frame storage means and the movement data storage means comprise separate solid state stores.

4. A system according to claim 1, wherein the selector means comprises a read selector normally switchable to select the first or second fields in dependence on which field the output information was derived and inhibit means for use when freeze operation is chosen to only allow the selector to select data from each field when portions of the picture not containing movement are present.

5. A system according to claim 1, wherein analog to digital converter means are provided to convert the information stored in the frame storage means from analog to digital form prior to storage.

6. A system according to claim 5, wherein decoder means are provided to decode the analog information into luminance and chrominance components prior to conversion.

7. A method of freezing a T.V. picture which may have at least some parts which have moved relative to a previous frame, said method comprising:
   storing picture information from first and second fields of the television picture;
   detecting on a picture point by picture point basis any picture movement present from the information on a predetermined portion of the picture and storing movement data representative thereof, and
   selectively outputting information from a single or both fields of the picture in dependence on the stored movement data, whereby the information is selected from both fields when no movement has been detected for that part of the picture and from a single field during parts of the picture where movement has been decreed to have occurred.

8. A method according to claim 7 including storing the movement data with the picture information to allow the data to accompany the picture information.

9. A method according to claim 7, including decoding the picture information into luminance and chrominance components, and converting the decoded information into digital form prior to storage.

* * * * *